United States Patent
Polehn et al.

(10) Patent No.: US 11,438,442 B1
(45) Date of Patent: Sep. 6, 2022

(54) SYSTEMS AND METHODS FOR OPTIMIZING PROVISION OF HIGH LATENCY CONTENT BY A NETWORK

(71) Applicant: Verizon Patent and Licensing Inc., Basking Ridge, NJ (US)

(72) Inventors: Donna L. Polehn, Mercer Island, WA (US); Maria G. Lam, Oakland, CA (US); Jin Yang, Orinda, CA (US); Lalit R. Kotecha, San Ramon, CA (US); Vishwanath Ramamurthi, San Ramon, CA (US); Patricia R. Chang, San Ramon, CA (US); Suzann Hua, Beverly Hills, CA (US); Arda Aksu, Lafayette, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/205,785

(22) Filed: Mar. 18, 2021

(51) Int. Cl.
  *H04L 67/568* (2022.01)
  *G06N 20/00* (2019.01)
  *H04L 43/0852* (2022.01)
  *H04L 67/306* (2022.01)
  *H04L 41/142* (2022.01)

(52) U.S. Cl.
  CPC .......... *H04L 67/568* (2022.05); *G06N 20/00* (2019.01); *H04L 41/142* (2013.01); *H04L 43/0852* (2013.01); *H04L 67/306* (2013.01)

(58) Field of Classification Search
  None
  See application file for complete search history.

(56) References Cited

U.S. PATENT DOCUMENTS

| | | | | |
|---|---|---|---|---|
| 6,345,292 B1* | 2/2002 | Daugherty | .......... | G06F 16/9574 709/214 |
| 7,478,164 B1* | 1/2009 | Lango | .................. | H04L 65/605 709/231 |
| 7,523,191 B1* | 4/2009 | Thomas | .............. | G06F 11/3438 709/202 |
| 9,053,124 B1* | 6/2015 | Dornquast | .......... | G06F 11/1453 |
| 9,582,666 B1* | 2/2017 | Overson | .................. | G06F 21/71 |
| 9,609,042 B1* | 3/2017 | Pallemulle | .............. | H04L 67/02 |
| 10,311,371 B1* | 6/2019 | Hotchkies | ................ | G06N 5/02 |
| 2005/0138546 A1* | 6/2005 | AbiEzzi | ................ | H04L 69/329 715/234 |
| 2014/0019577 A1* | 1/2014 | Lobo | .................. | H04L 67/2842 709/213 |

(Continued)

*Primary Examiner* — Scott B Christensen

(57) ABSTRACT

A multi-access edge computing device may receive historical content data associated with a content application of a user equipment and may process the historical content data, with a machine learning model, to identify content to cache for the user equipment. The multi-access edge computing device may provide, to a content provider device, a request for the content to cache and may receive, from the content provider device, the content to cache based on the request for the content to cache. The multi-access edge computing device may process the content to cache, with a document object model and a browser object model, to generate intermediary content that corresponds to the content to cache. The multi-access edge computing device may store the intermediary content in a data structure associated with the multi-access edge computing device.

20 Claims, 10 Drawing Sheets

(56) References Cited

U.S. PATENT DOCUMENTS

| | | | | |
|---|---|---|---|---|
| 2014/0258847 | A1* | 9/2014 | Cleave | G06F 16/957 |
| | | | | 715/235 |
| 2014/0259147 | A1* | 9/2014 | L'Heureux | H04L 63/083 |
| | | | | 726/14 |
| 2014/0282281 | A1* | 9/2014 | Ram | G06Q 50/01 |
| | | | | 715/863 |
| 2015/0261873 | A1* | 9/2015 | Blinn | G06Q 20/02 |
| | | | | 705/14.73 |
| 2016/0117355 | A1* | 4/2016 | Krishnamurthy | H04L 67/22 |
| | | | | 707/749 |
| 2016/0150050 | A1* | 5/2016 | Shin | H04L 67/101 |
| | | | | 709/226 |
| 2017/0214764 | A1* | 7/2017 | Bakshi | G06Q 30/02 |
| 2018/0032491 | A1* | 2/2018 | Heo | H04L 63/1416 |
| 2018/0167486 | A1* | 6/2018 | Pacella | H04L 67/2842 |
| 2018/0218086 | A1* | 8/2018 | Hendri | H04L 67/02 |
| 2019/0087707 | A1* | 3/2019 | Cummins | G06N 5/04 |
| 2019/0149629 | A1* | 5/2019 | Wetterwald | H04L 67/2842 |
| | | | | 709/217 |
| 2020/0128067 | A1* | 4/2020 | Guim Bernat | G06F 16/90339 |
| 2020/0151726 | A1* | 5/2020 | Song | G06Q 20/4014 |
| 2020/0175419 | A1* | 6/2020 | Bird | G06N 20/00 |
| 2021/0112136 | A1* | 4/2021 | Seo | H04L 67/2842 |
| 2021/0266353 | A1* | 8/2021 | Grubb | H04N 21/2183 |

\* cited by examiner

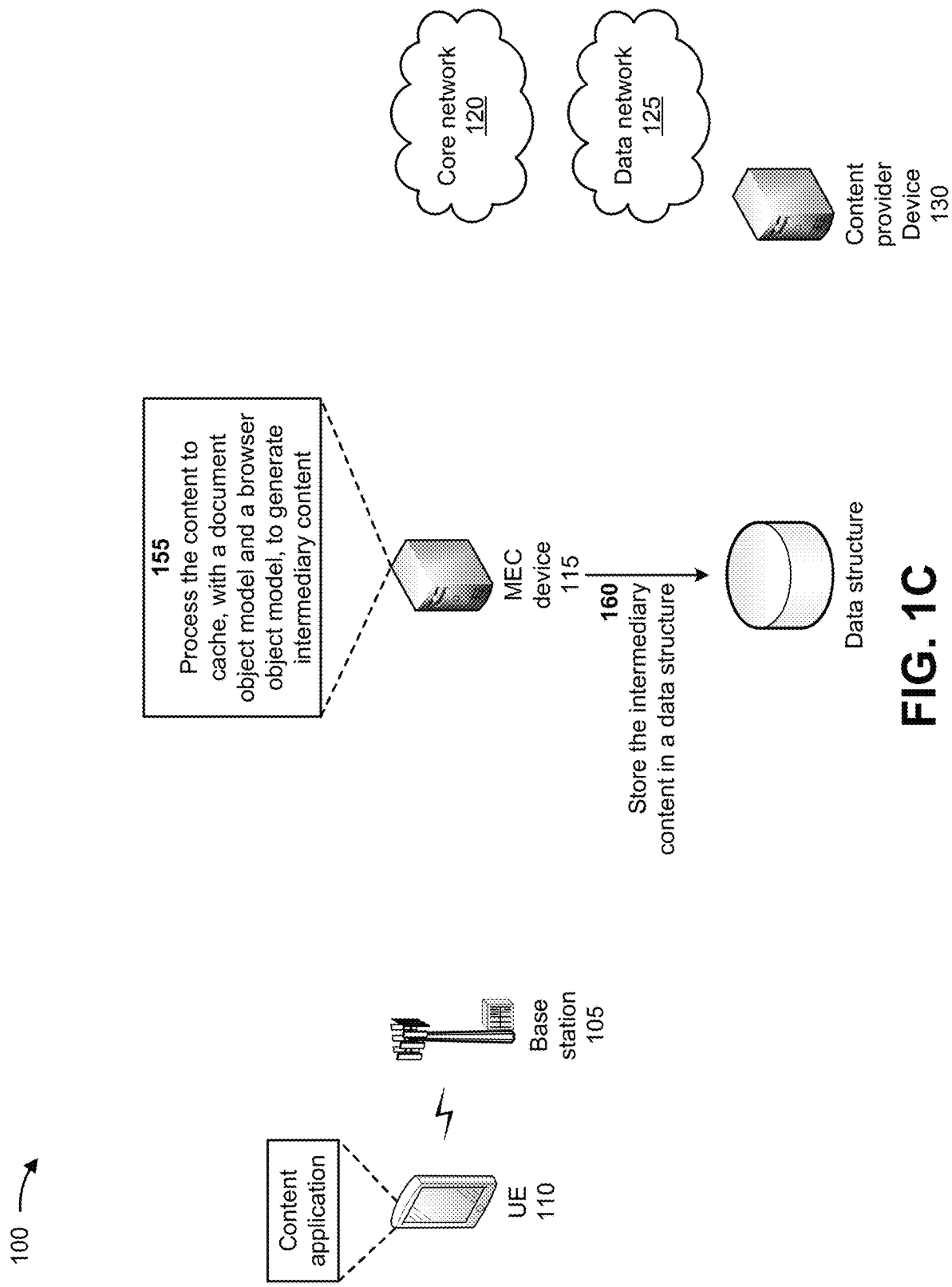

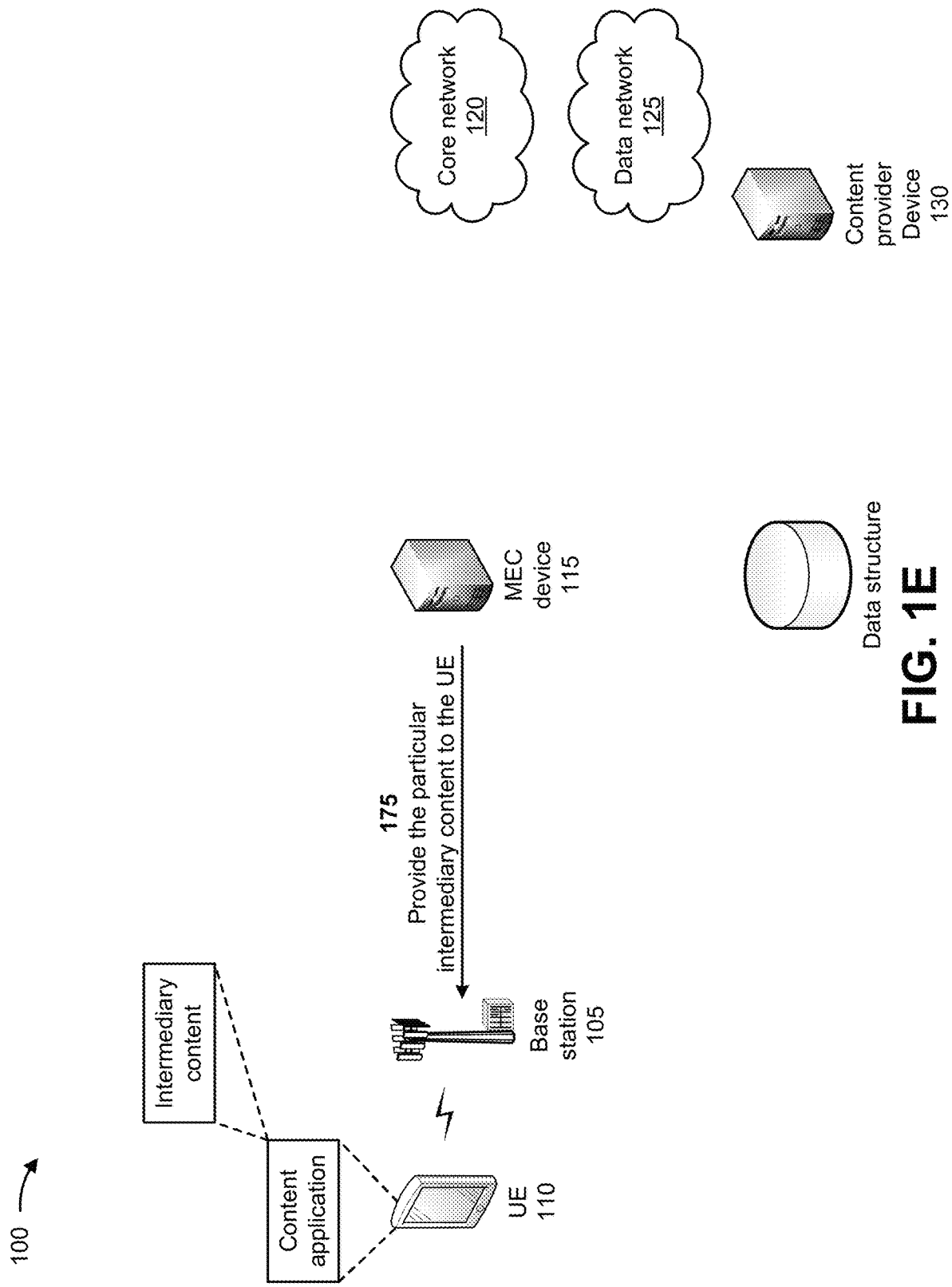

SYSTEMS AND METHODS FOR OPTIMIZING PROVISION OF HIGH LATENCY CONTENT BY A NETWORK

BACKGROUND

Multi-access edge computing (MEC) is a technology that provides computing resources at an edge of a network. A MEC device may support computing requirements of user equipment (UEs) that are within an area of service of the MEC device.

BRIEF DESCRIPTION OF THE DRAWINGS

FIGS. 1A-1F are diagrams of an example associated with optimizing provision of high latency content by a network.

DETAILED DESCRIPTION OF PREFERRED EMBODIMENTS

Figure 1A:
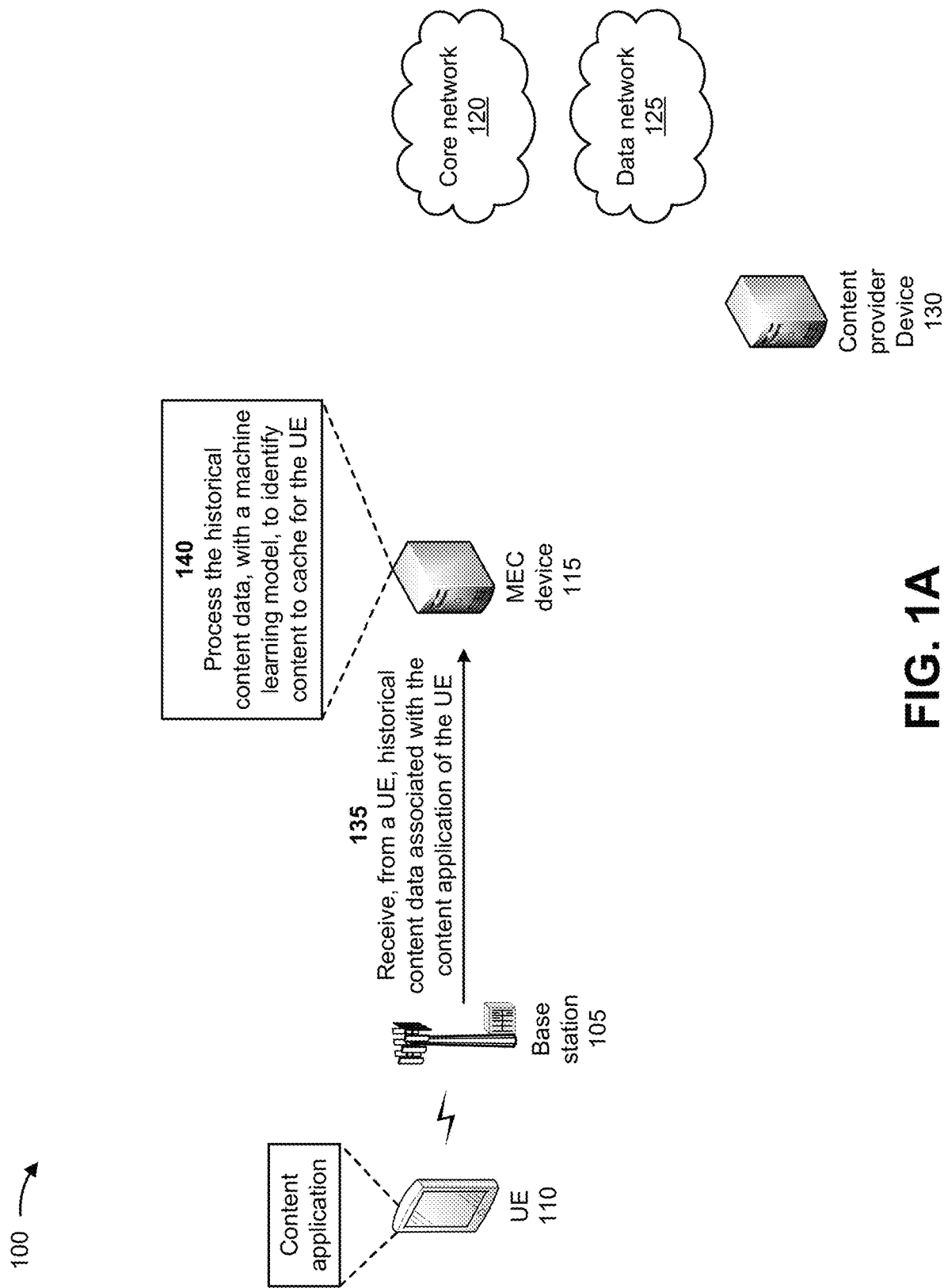

The following detailed description of example implementations refers to the accompanying drawings. The same reference numbers in different drawings may identify the same or similar elements.

MEC devices may be provisioned at multiple locations within a network, such as a cellular network. For example, a MEC device may be provisioned within a core network, a radio access network (RAN), and/or a base station, among other examples. Because MEC devices are provisioned within a network, rather than a remote data center where cloud computing resources may be provisioned, a measure of latency between a MEC device and a UE may be lower than a measure of latency between a cloud computing resource and the UE. Low latency may be required for certain applications of the UE, such as augmented reality applications, virtual reality applications, vehicle control applications, and/or machine control applications, among other examples. MEC devices may, therefore, be more suitable to provide computing resources for such applications.

Some content (e.g., websites) provided to a UE may have high latency regardless of how fast an access network is for the UE. For example, a first website may have low latency and be quickly displayed on the UE, whereas a second website may have high latency and be slowly displayed on the UE. A content application (e.g., a web browser) utilized by the UE to view the content is inherently slow and download limited. Thus, utilizing MEC devices simply to provide access to the second website may not improve the high latency associated with the second website.

Some implementations described herein provide a network device (e.g., a MEC device) that optimizes provision of high latency content by a network. For example, the MEC device may receive historical content data associated with a content application of a user equipment and may process the historical content data, with a machine learning model, to identify content to cache for the user equipment. The MEC device may provide, to a content provider device, a request for the content to cache and may receive, from the content provider device, the content to cache based on the request for the content to cache. The MEC device may process the content to cache, with a document object model and a browser object model, to generate intermediary content that corresponds to the content to cache and may store the intermediary content in a data structure associated with the MEC device.

In this way, the MEC device may optimize provision of high latency content by a network. For example, the MEC device may retrieve high latency content that is historically utilized by the UE and may process the high latency content, with a document object model and a browser object model, to generate and cache intermediary content format that may be displayed by the UE. When the UE accesses content corresponding to the intermediary content, the MEC device may quickly stream the intermediary content to the UE. Thus, the MEC device may conserve computing resources (e.g., processing resources, memory resources, communication resources, and/or the like), networking resources, and other resources that would have otherwise been consumed by providing the high latency content to the UE, positioning network resources to attempt to improve provision of the high latency content, unsuccessfully diverting network resources from low latency content to service the high latency content, and/or the like.

FIGS. 1A-1F are diagrams of an example 100 associated with optimizing provision of high latency content by a network. As shown in FIGS. 1A-1F, example 100 includes a base station 105 associated with a UE 110, a MEC device 115, a core network 120, a data network 125, and a content provider device 130. Further details of the base station 105, the UE 110, the MEC device 115, the core network 120, the data network 125, and the content provider device 130 are provided below.

As shown in FIG. 1A, and by reference number 135, the MEC device 115 receives, from a UE 110, historical content data associated with a content application of the UE 110. The MEC device 115 may be included in a MEC environment and/or an access network associated with the UE 110. In a MEC environment, computing is enabled by a network architecture that provides computing capabilities to a connected device (e.g., UE 110) via computing platforms at or near an edge of a network (e.g., a wireless communication network). Accordingly, because a MEC environment may provide computing at or near the edge of the network, increased performance may be achieved over networks in which computing is performed topologically and/or physically further from a connected device. For example, the MEC environment may offer improved performance due to less traffic and/or congestion between the connected device and the computing node(s), less latency (due to closer proximity to the connected device), increased flexibility (due to a greater amount of computing node(s)), and/or the like.

In some implementations, the UE 110 has access to a plurality of MEC devices included in the MEC environment. The UE 110 may determine that the MEC device 115 is the geographically closest MEC device and/or a logically closest (e.g., having a fewest number of devices between the MEC device 115 and the UE 110 along a route which the historical content data is transmitted)) MEC device relative to the other MEC devices of the plurality of MEC devices. The UE 110 may provide the historical content to the MEC device 115 based on the MEC device 115 being the geographically and/or logically closest MEC device.

The content application may include a browser application associated with a web browser, a streaming media application associated with a media player and/or another type of application configured to receive media (e.g., audio, video, and/or the like) via a network and provide the media to a user of the UE 110, and/or another type of application configured to receive content (e.g., web pages, content associated with an online application, content associated with online gaming, audio, video, documents, and/or the like) via a network and provide the content to a user of the UE 110 (e.g., via an output device associated with the UE 110, such as a display and/or a speaker, among other examples). In some implementations, the content application includes a browser extension associated with a web browser of the UE 110. Alternatively, and/or additionally, the content application may include an application configured to determine where and/or how to display content based on limitations of an application (e.g., a web browser and/or a media player, among other examples) with which the content application is associated.

The historical content data may include information identifying content accessed by and/or provided to a user of the UE 110 over a time period (e.g., one day, one week, one month, one year, and/or the like). In some implementations, the content identified by the historical content data includes content most frequently accessed by and/or provided to the user during the time period relative to other content accessed by and/or provided to the user during the time period, content identified by the user (e.g., content included in a favorites list of a web browser), content associated with an application (e.g., an online application, an online gaming application, and/or the like) utilized by the user during the time period, and/or the like.

In some implementations, the content application, the MEC device 115, and/or the content provider device 130 may monitor a latency associated with receiving and/or providing content during the time period and the historical content data may identify received and/or provided content associated with a higher latency relative to latencies associated with other content received and/or provided during the time period. The latency may include a network latency, a latency associated with loading and/or rendering the content by the UE 110, and/or the like.

In some implementations, the content application determines the latency associated with loading and/or rending the content based on an amount of time required to load and/or render the content. The content application may determine that the content is associated with a high latency when the amount of time satisfies one or more criteria (e.g., satisfies a time threshold, crosses a time threshold, and/or the like). In some implementations, the MEC device 115 determines a latency associated with rendering and/or providing content based on a document object model and/or a browser object model associated with the content. The MEC device 115 may estimate a complexity associated with the document object model and/or the browser object model. The MEC device 115 may determine that an amount of time required to render content increases based on a complexity associated with a document object model and/or a browser object associated with the content and, therefore, the MEC device 115 may determine that content is associated with a high latency when the estimated complexity satisfies one or more criteria (e.g., satisfies one or more thresholds, crosses one or more thresholds, and/or the like).

Alternatively, and/or additionally, the historical content data may include content associated with latency that satisfies one or more criteria (e.g., greater than a threshold, equal to a threshold, less than a threshold, crossing a threshold, and/or the like). The UE 110 (e.g., the content application) may provide the historical content to the MEC device 115 periodically (e.g., daily, weekly, monthly, and/or the like), based on a receiving a request for the historical content data from the MEC device 115, and/or based on an occurrence of an event (e.g., expiration of the time period, content being downloaded a particular quantity of times, and/or a latency associated with content satisfying a latency threshold, among other examples).

Alternatively, and/or additionally, the MEC device 115 may receive historical content data from content provider device 130. The content provider device 130 may monitor a quantity of times content provided by the content provider device 130 is downloaded via the MEC environment, via the MEC device 115, by the UE 110, by UEs operating in a geographical area associated with the MEC device 115, and/or the like. The content provider device 130 may provide historical content data provided by the content provider device 130 during a time period and/or satisfying one or more criteria (e.g., content downloaded a threshold quantity of times, content downloaded more frequently relative to other content provided by the content provider device 130, content associated with a latency that satisfies a latency threshold, and/or the like). The content provider device 130 may provide the historical content to the MEC device 115 periodically (e.g., daily, weekly, monthly, and/or the like), based on receiving a request for the historical content data from the MEC device 115, and/or based on an occurrence of an event (e.g., expiration of the time period, content being downloaded a particular quantity of times, and/or a latency associated with content satisfying a latency threshold, among other examples).

As shown by reference number 140, the MEC device 115 processes the historical content data, with a machine learning model, to identify content to cache for the UE 110. The machine learning model may include a heuristic prediction model. The machine learning model may receive the historical content data as an input and may generate an output indicating content to cache for the UE 110 and a confidence score that reflects a measure of confidence that the content to cache is accurately identified.

In some implementations, the historical content data identifies content that is currently being provided to a user via the UE 110. The MEC device 115 may process the historical data, with the machine learning model, to determine the content to cache based on the content currently being provided to the user. For example, the MEC device 115 may identify particular content requested by the UE 110 after receiving the content currently being provided to the user. The MEC device 115 may determine, based on the historical content data, that a quantity of times the particular content has been requested satisfies one or more criteria. The MEC device 115 may include the particular content in the content to be cached based on the quantity of times the particular content has been requested satisfying the one or more criteria.

In some implementations, the MEC device 115 receives network data identifying a bandwidth associated with an access network of the UE, a latency associated with the access network, and/or the like. The MEC device 115 may process the historical content data and the network data, with the machine learning model, to identify the content to cache. The content to cache may include content that is accessed by the content application during a time period, content that is accessed by the content application and fails to satisfy a latency threshold, a percentage of content accessed by the content application, content associated with latencies satisfying one or more criteria, content accessed by the content application that is accessed by a quantity of other UEs during a time period, and/or the like.

In some implementations, the MEC device 115 creates a latency table that identifies the content accessed by the content application and latencies associated with the accessed content. The MEC device 115 may identify a percentage of the content identified in the latency table as the content to cache based on the latencies associated with the content. For example, the MEC device 115 may identify a percentage of the content identified in the latency table associated with latencies satisfying one or more criteria, a percentage of the content identified in the latency table associated with latencies greater than latencies associated with other content identified in the latency table, and/or the like.

In some implementations, the MEC device 115 may receive additional historical content data associated with a plurality of other UEs. The MEC device 115 may process the historical content data and the additional historical content data, with the machine learning model, to identify the content to cache for the UE 110. For example, the MEC device 115 may identify particular content requested by other UEs after receiving content currently being provided to the UE 110. The MEC device 115 may determine, based on the additional historical content data, that a quantity of times the particular content has been requested satisfies one or more criteria. The MEC device 115 may include the particular content in the content to be cached based on the quantity of times the particular content has been requested satisfying the one or more criteria.

In some implementations, the MEC device 115 determines the content to cache based on user input. For example, a user may input information indicating particular content to cache (e.g., information identifying a particular web site), information identifying a rule for determining content to cache (e.g., always/never cache particular content, always/never cache content provided by a particular application, always/never cache a particular type of content (e.g., web pages, streaming audio, streaming video, and/or the like), and/or cache particular content during a particular time period, among other examples).

In some implementations, the MEC device 115 trains the machine learning model to determine the content to cache based on historical training data. For example, the MEC device 115 may train the machine learning model to determine the content to cache in a manner similar to that described below with respect to FIG. 2. Alternatively, and/or additionally, the MEC device 115 may receive a trained machine learning model from another device (e.g., a server device associated with a network associated with the MEC device 115, a third-party server device, the content provider device 130, and/or the like).

Figure 1B:
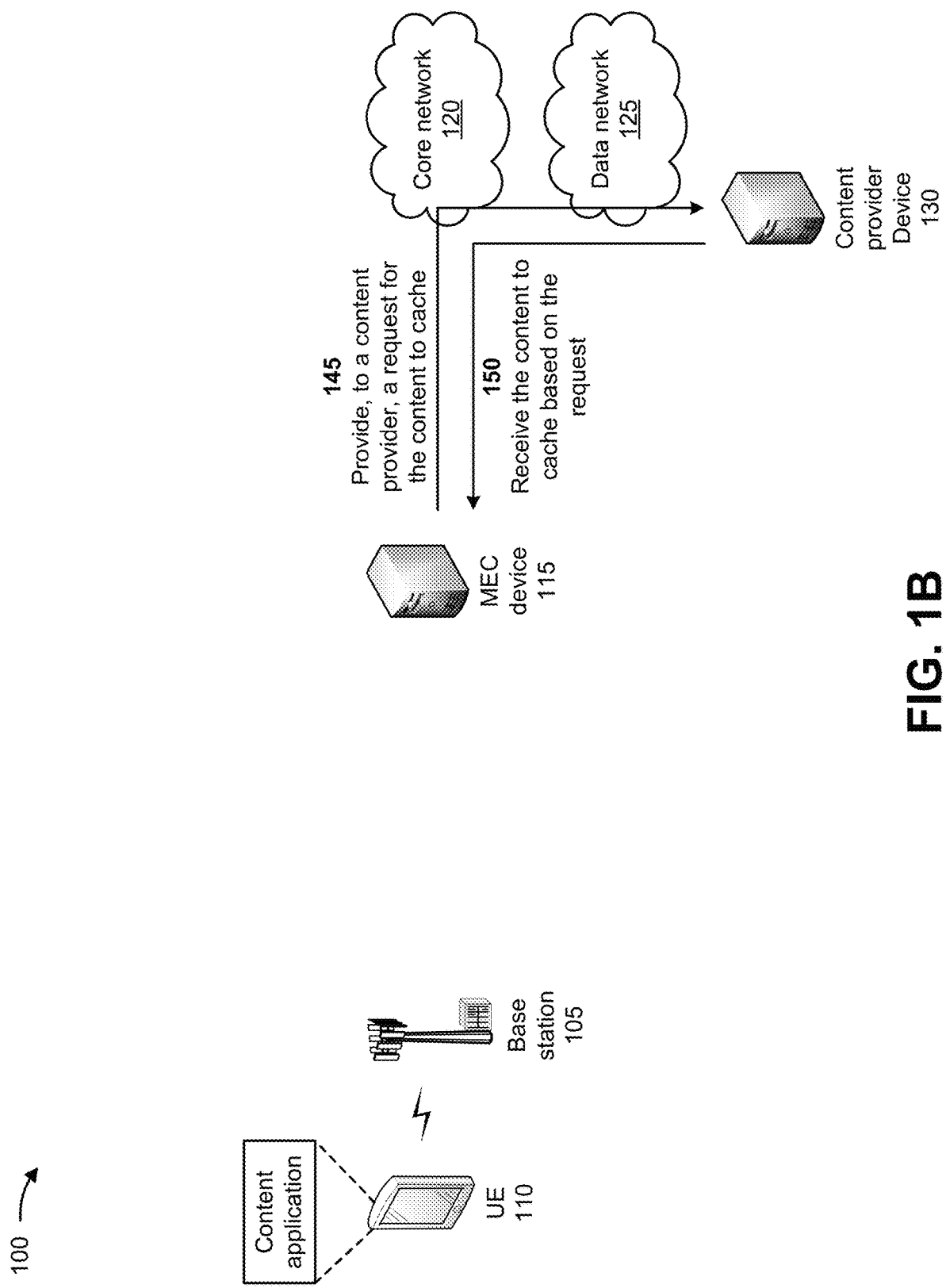

As shown in FIG. 1B, and by reference number 145, the MEC device 115 provides, to the content provider device 130, a request for the content to cache. The request for the content to cache may include information identifying content to be provided by the content provider device 130 and/or cached by the MEC device 115. In some implementations, the request for the content to cache may include information identifying content to be cached by another device. For example, the request for the content to cache may identify content to be cached by the UE 110, customer premises equipment associated with the UE 110, a server device associated with the UE 110, a data storage device associated with the UE 110 and/or the MEC device 115, and/or the like.

The content provider device 130 may receive the request for the content to cache and may provide the content to cache to the MEC device 115 (and/or another device indicated in the request for content to cache). As shown by reference number 150, the MEC device 115 receives the content to cache from the content provider device 130 based on the request.

Alternatively, and/or additionally, the MEC device 115 may receive the content to cache during a time period identified by the content provider device 130. The content provider device 130 may provide the content to the cache during a time period in which one or more parameters associated with the content to cache satisfy one or more criteria. For example, the content provider device 130 may identify a time period in which a latency associated with the content to cache satisfies a latency threshold, a quantity of downloads of the content to cache satisfies a quantity threshold, and/or the like. The content provider device 130 may identify the time period based on historical data associated with downloading the content to cache and/or real-time data associated with downloading the content to cache. The content provider device 130 may provide the content to cache to the MEC device 115 during the time period based on the one or more parameters associated with the content to cache satisfying the one or more criteria.

As shown in FIG. 1C, and by reference number 155, the MEC device 115 processes the content to cache, with a document object model and a browser object model, to generate intermediary content. The intermediary content may include a pre-rendering of the content to cache, by the MEC device 115, based on heuristic prediction algorithms, the document object model, and/or the browser object model.

The MEC device 115 may run an implementation of an application (e.g., a web browser) and may render a document object model and a browser object model associated with the content to cache to an intermediary image format and/or an intermediary content format, such as a scalable vector graphics (SVG) format, a bitmap image file (BMP) format, a wave format, and/or the like.

The document object model may represent content associated with a web page as objects that can be modified. For example, the document object model may include a document object that enables properties of a document (e.g., a web page) to be created, removed, and/or modified.

The browser object model may be a browser-specific convention that includes a set of objects exposed by a web browser. For example, the browser object model may include a navigator object configured to provide background information about the web browser and/or an operating system associated with the UE 110, a location object configured to read a current uniform resource locator (URL) and/or to re-direct the web browser to a different URL, and/or the like.

As shown by reference number 160, the MEC device 115 stores the intermediary content in a data structure (e.g., a database, a table, a list, and/or the like) associated with the MEC device 115. In some implementations, the data structure is stored in a memory of the MEC device 115. In some implementations, the data structure is stored in a memory of a network device associated with the MEC device 115. In some implementations, the data structure is stored in a memory of customer premise equipment associated with the MEC device 115 and/or the UE 110.

In some implementations, the MEC device 115 provides information indicating that the intermediary content associated with the content to be cached is stored in the data structure. The content application may receive the information and may provide an indication associated with the content to be cached to a user associated with the UE 110. For example, content included in the content to be cached may be identified in a favorites list associated with a browser application. The content application may cause an indication to be displayed in association with the content in the favorites list based on the intermediary content being stored in the data structure. For example, the content application may cause a particular symbol, a particular icon, the word "cached," and/or the like to be displayed next to a name of the content in the favorites list, the content application may cause the name of the content to be displayed in a particular color, and/or the like.

In some implementations, the content application causes the UE 110 to provide bypass information to the MEC device 115 based on receiving the information indicating that the intermediary content associated with the content to be cached is stored in the data structure. The bypass information may include information indicating that the intermediary content associated with the content to be cached is not to be provided to the UE 110, is not to be provided to UE 110 during a particular time period, that an original form (e.g., hypertext markup language (HTML)) of the particular content is to be obtained by the MEC device 115 and/or provided to the UE 110, and/or the like. The content application may cause the UE 110 to provide the bypass information based on a user input and/or another type of information.

Figure 1D:
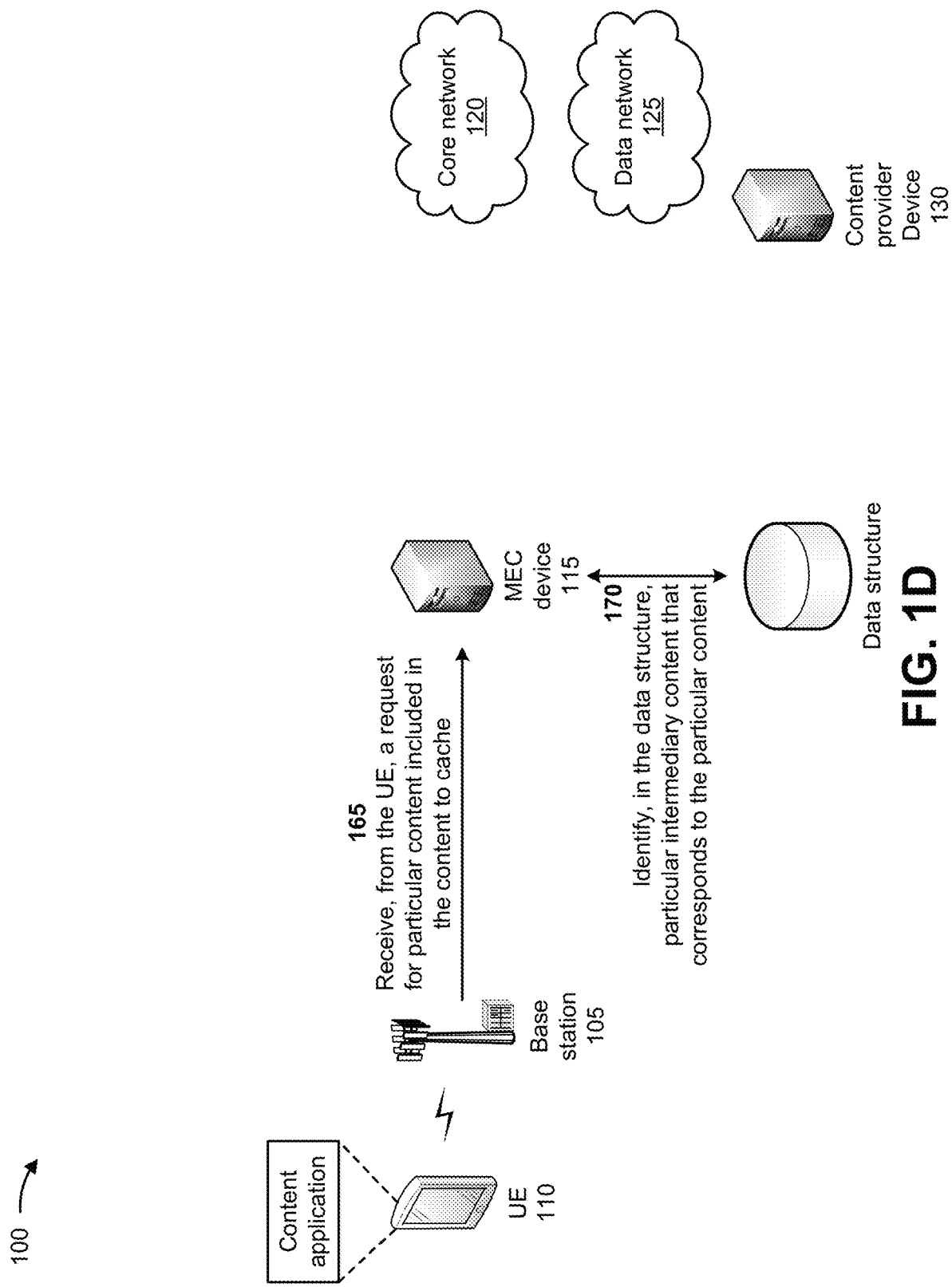

As shown in FIG. 1D, and by reference number 165, the MEC device 115 receives, from the UE 110, a request for particular content included in the content to cache. As shown by reference number 170, the MEC device 115 identifies, in the data structure, particular intermediary content that corresponds to the particular content. The MEC device 115 may identify the particular intermediary content based on the particular intermediary content being associated with information identifying the particular content (e.g., a uniform resource locator (URL) of a web page associated with the particular content, an identifier associated with a web page associated with the particular content, and/or the like) and/or included in the request for the particular content.

As shown in FIG. 1E, and by reference number 175, the MEC device 115 provides the particular intermediary content to the UE 110. The content application may cause the intermediary content to be provided to a user of the UE 110 based on the intermediary content being provided to the UE 110.

In some implementations, the MEC device 115 causes the particular content to be provided to the UE 110 by another device (e.g., another UE 110, another MEC device 115, customer premises equipment associated with the UE 110, and/or the like). The MEC device 115 may determine that the particular content has been provided to the other device during a previous time period (e.g., within the past five minutes, within the past ten minutes, and/or the like) and/or is stored on the other device. The MEC device 115 may determine that the other device is able to provide the content to the UE 110. For example, the MEC device 115 may determine that the other device and the UE 110 are connected to a same network, are within a particular distance from each other, are able to communicate via direct communication, and/or the like. The MEC device 115 may provide a message to the other device to cause the other device to provide the particular content to the UE 110. The message may include information identifying the particular content, information identifying the UE 110, information indicating that the other device is to provide the particular content to the UE 110 via direct communication, and/or the like.

Figure 1F:
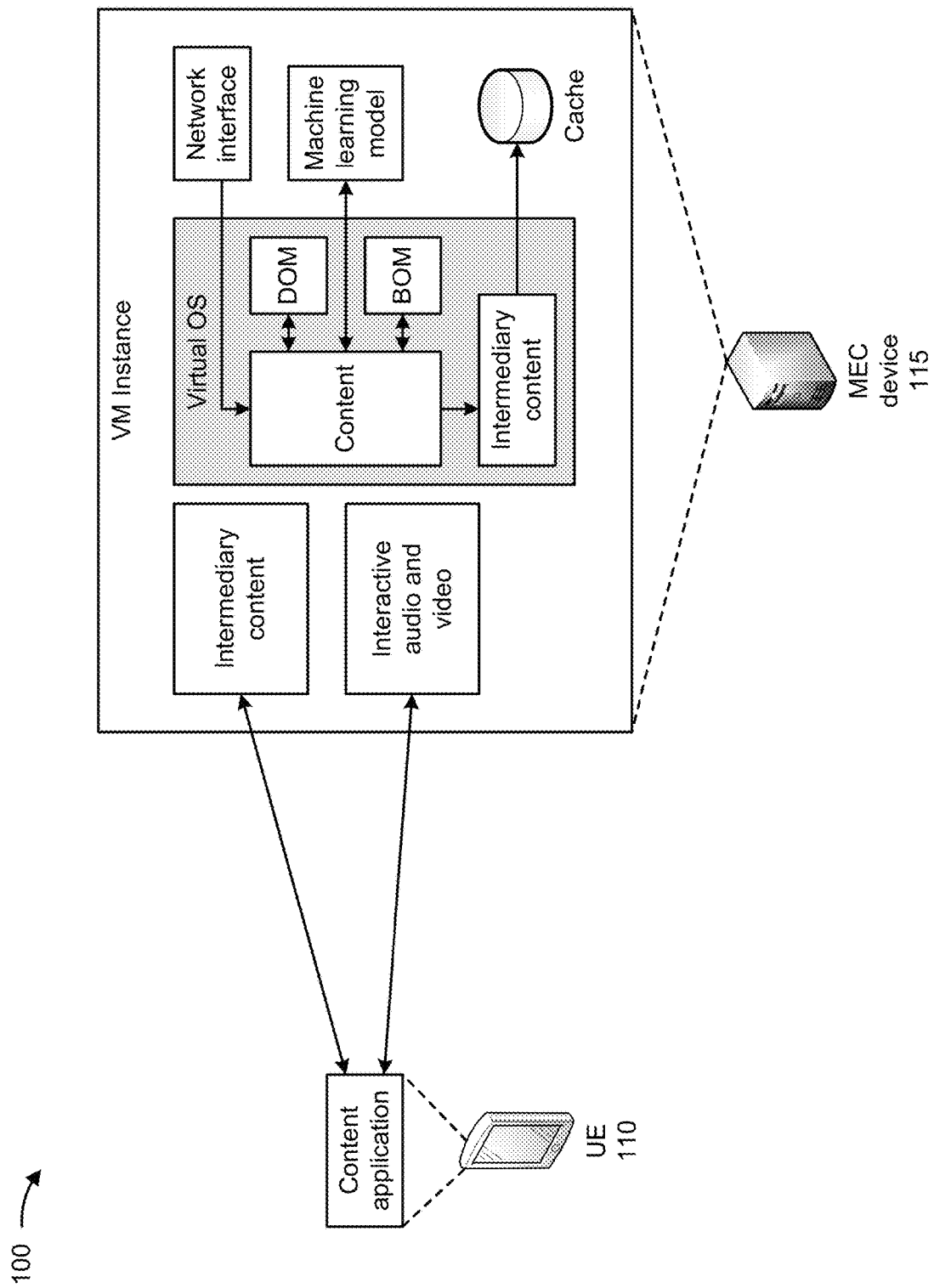

In some implementations, the MEC device 115 includes a virtual machine instance. As shown in FIG. 1F, the virtual machine instance may be associated with a virtual operating system, a network interface, a machine learning model, and/a cache. The virtual machine instance may utilize the virtual operating system, the network interface, the machine learning model, and/or the cache to receive the historical content data, identify the content to be cached based on the historical content data, request the content to be cached, receive the content to be cached, generate the intermediary content, receive the request for the particular content, identify the particular intermediary content, and/or provide the particular intermediary content to the UE 110, in a manner similar to that described above.

In this way, the MEC device 115 may optimize provision of high latency content by a network. For example, the MEC device 115 may retrieve high latency content that is historically utilized by the UE 110 and may process the high latency content, with a document object model and a browser object model, to generate and cache an intermediary content that may be displayed by the UE 110. When the UE 110 accesses content corresponding to the intermediary content, the MEC device 115 may quickly stream the intermediary content to the UE 110. Thus, the MEC device 115 may conserve computing resources, networking resources, and other resources that would have otherwise been consumed by providing the high latency content, positioning network resources to attempt to improve provision of the high latency content, unsuccessfully diverting network resources from low latency content to service the high latency content, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
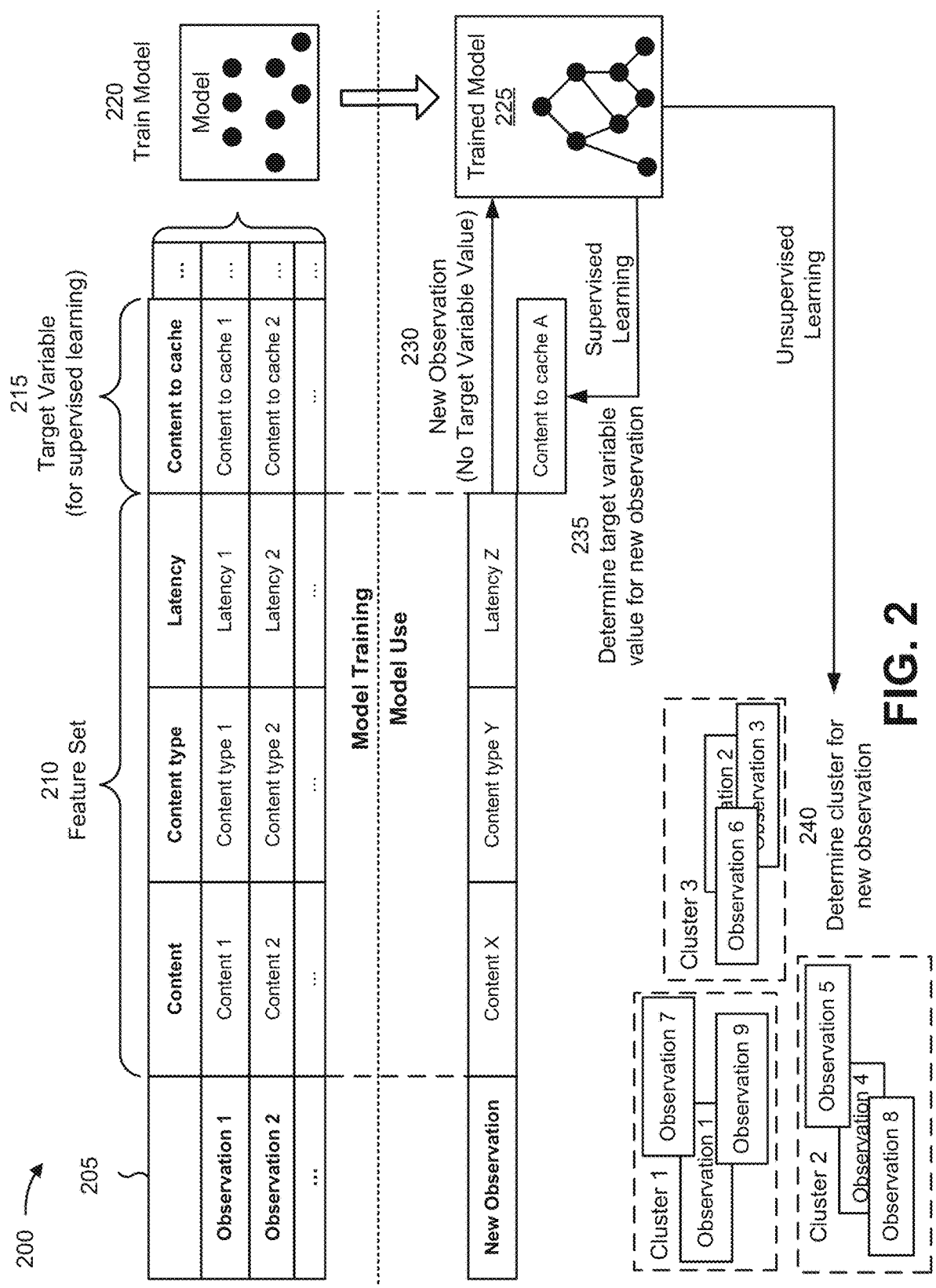
FIG. 2 is a diagram illustrating an example of training and using a machine learning model in connection with optimizing provision of high latency content by a network.

FIG. 2 is a diagram illustrating an example 200 of training and using a machine learning model in connection with optimizing provision of high latency content by a network. The machine learning model training and usage described herein may be performed using a machine learning system. The machine learning system may include or may be included in a computing device, a server, a cloud computing environment, and/or the like, such as the MEC device 115 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the MEC device 115, as described elsewhere herein.

As shown by reference number 210, the set of observations includes a feature set. The feature set may include a set of variables, and a variable may be referred to as a feature.

A specific observation may include a set of variable values (or feature values) corresponding to the set of variables. In some implementations, the machine learning system may determine variables for a set of observations and/or variable values for a specific observation based on input received from the MEC device 115. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of content, a second feature of content type, a third feature of latency, and so on. As shown, for a first observation, the first feature may have a value of content 1, the second feature may have a value of content type 1, the third feature may have a value of latency 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is content to cache, which has a value of content to cache 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of content X, a second feature of content type Y, a third feature of latency Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of content to cache A for the target variable of the content to cache for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a content cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a content type cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to optimize provision of high latency content by a network. The machine learning system enables recognition and/or identification of tens, hundreds, thousands, or millions of features and/or feature values for tens, hundreds, thousands, or millions of observations, thereby increasing accuracy and consistency and reducing delay associated with optimizing provision of high latency content by a network relative to requiring computing resources to be allocated for tens, hundreds, or thousands of operators to manually optimize provision of high latency content by a network.

As indicated above, FIG. 2 is provided as an example. Other examples may differ from what is described in connection with FIG. 2.

Figure 3:
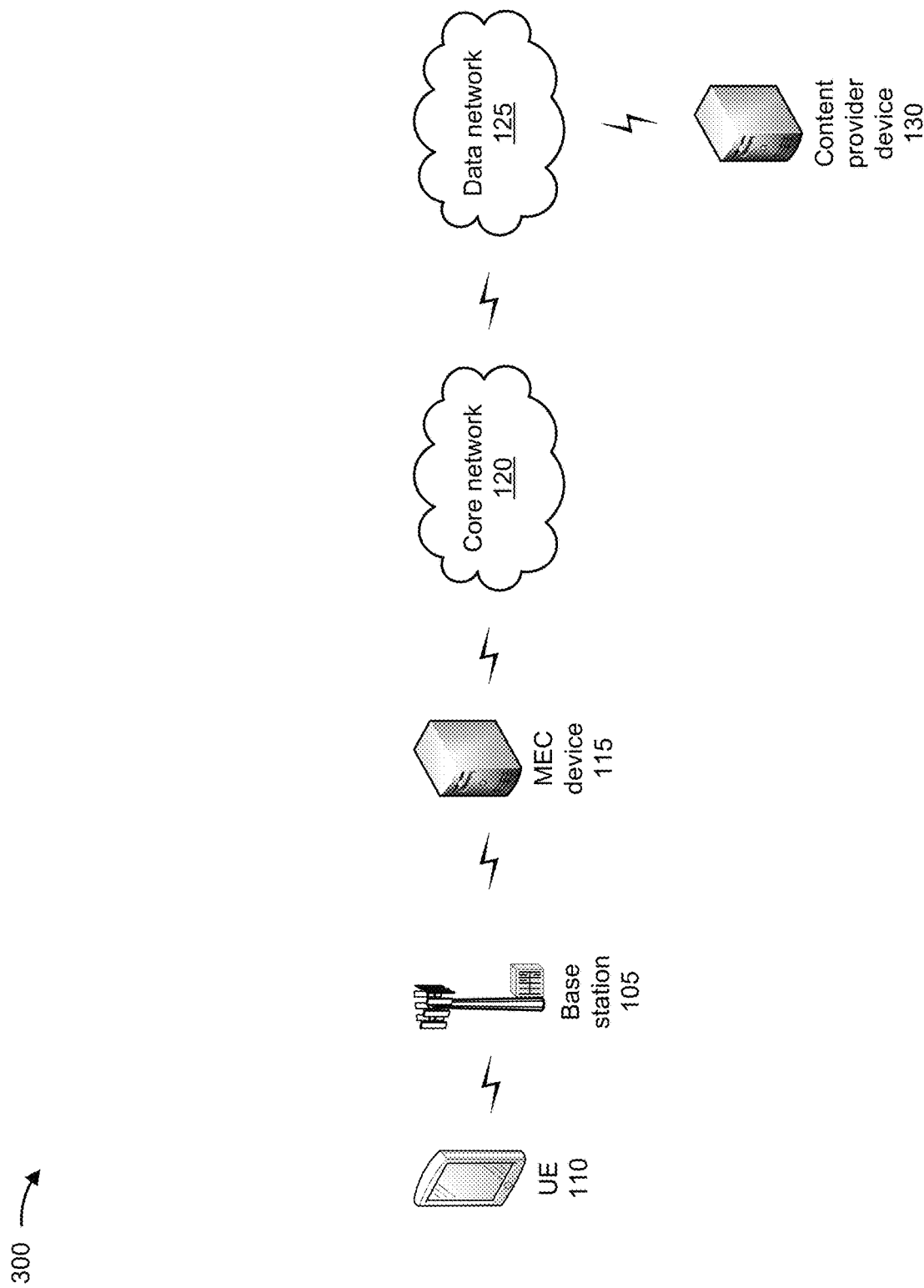
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include the base station 105, the UE 110, the MEC device 115, the core network 120, the data network 125, and/or the content provider device 130. Devices and/or elements of environment 300 may interconnect via wired connections and/or wireless connections.

The base station 105 includes one or more devices capable of transferring traffic, such as audio, video, text, and/or other traffic, destined for and/or received from UE 110. For example, the base station 105 may include an eNodeB (eNB) associated with an LTE network that receives traffic from and/or sends traffic to a core network, a gNodeB (gNB) associated with a RAN of a 5G network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication.

The UE 110 includes one or more devices capable of receiving, generating, storing, processing, and/or providing information, as described elsewhere herein. UE 110 may include a communication device. For example, the UE 110 may include a wireless communication device, a mobile phone, a laptop computer, a tablet computer, a gaming console, a set-top box, a wearable communication device (e.g., a smart wristwatch, a pair of smart eyeglasses, a head mounted display, or a virtual reality headset), or a similar type of device.

The MEC device 115 includes one or more devices capable of receiving, generating, storing, processing, providing, and/or routing information, as described elsewhere herein. The MEC device 115 may include a communication device and/or a computing device. For example, the MEC device 115 may include a device, such as an application device, a client device, a web device, a database device, a host device, a proxy device, a virtual device (e.g., executing on computing hardware), or a device in a cloud computing system. In some implementations, the MEC device 115 includes computing hardware used in a cloud computing environment.

The core network 120 may include a core network or a RAN that includes one or more base stations 105 that take the form of eNBs, gNBs, among other examples, via which a user device (e.g., a mobile phone, a laptop computer, a tablet computer, a desktop computer, among other examples) communicates with a core network. The core network 120 may include one or more wired and/or wireless networks. For example, the core network 120 may include a cellular network (e.g., a 5G network, an LTE network, a 3G network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, among other examples, and/or a combination of these or other types of networks.

The data network 125 includes one or more wired and/or wireless networks. For example, the data network 125 may include a LAN, a WAN, a MAN, a telephone network (e.g., the PSTN), a private network, an ad hoc network, an intranet, the Internet, a fiber optic-based network, among other examples, and/or a combination of these or other types of networks.

The content provider device 130 includes one or more devices capable of receiving, generating, storing, processing, providing, and/or routing information, as described elsewhere herein. The content provider device 130 may include a communication device and/or a computing device. For example, the content provider device 130 may include a server, such as an application server, a client server, a web server, a database server, a host server, a proxy server, a virtual server (e.g., executing on computing hardware), or a server in a cloud computing system. In some implementations, the content provider device 130 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
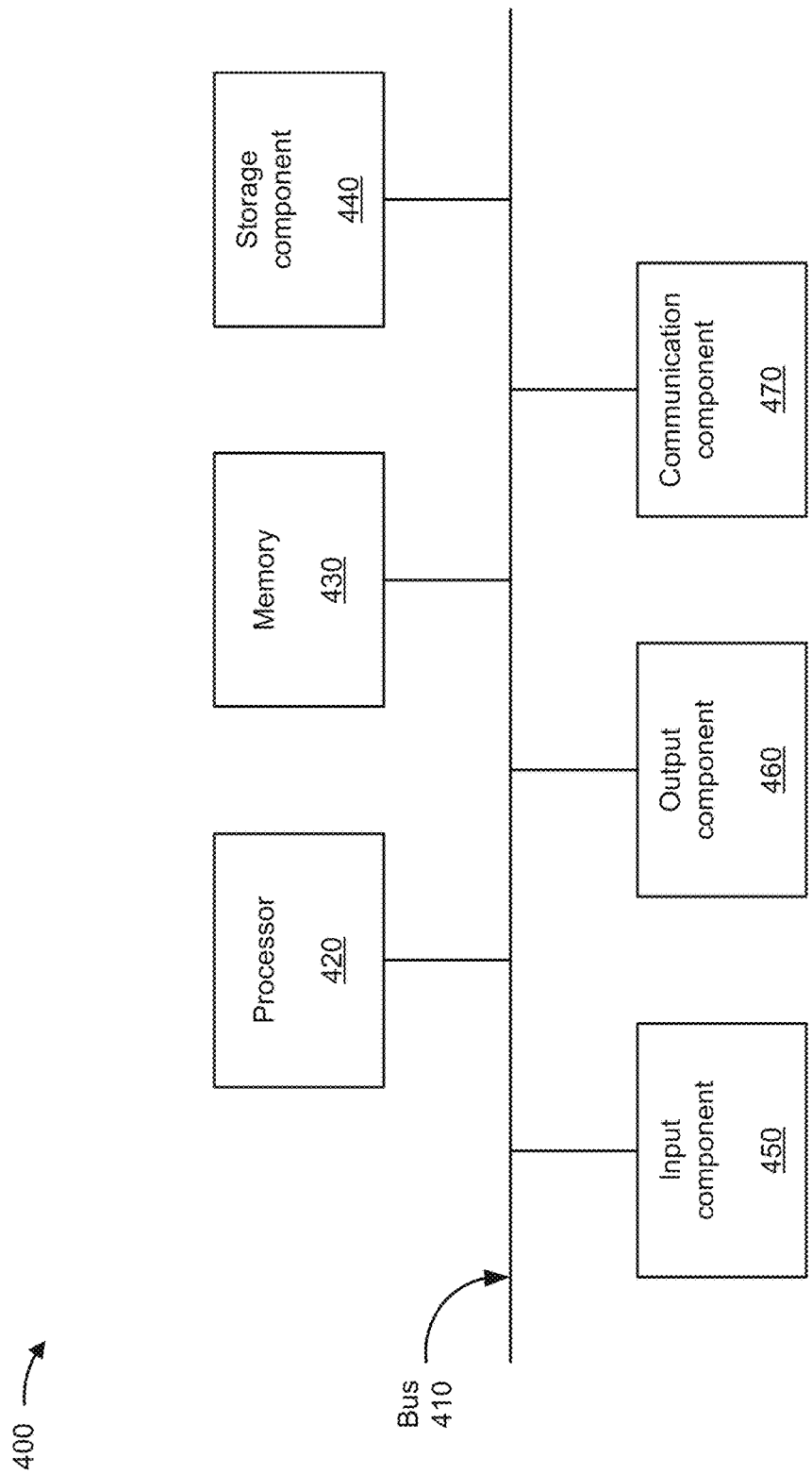
FIG. 4 is a diagram of example components of one or more devices of FIG. 3.

FIG. 4 is a diagram of example components of one or more devices of FIG. 3. The one or more devices may include a device 400, which may correspond to the base station 105, the UE 110, the MEC device 115, and/or the content provider device 130. In some implementations, the base station 105, the UE 110, the MEC device 115, and/or the content provider device 130 may include one or more devices 400 and/or one or more components of the device 400. As shown in FIG. 4, the device 400 may include a bus 410, a processor 420, a memory 430, a storage component 440, an input component 450, an output component 460, and a communication component 470.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The storage component 440 stores information and/or software related to the operation of device 400. For example, the storage component 440 may include a hard disk drive, a magnetic disk drive, an optical disk drive, a solid-state disk drive, a compact disc, a digital versatile disc, and/or another type of non-transitory computer-readable medium. The input component 450 enables device 400 to receive input, such as user input and/or sensed inputs. For example, the input component 450 may include a touch screen, a keyboard, a keypad, a mouse, a button, a microphone, a switch, a sensor, a global positioning system component, an accelerometer, a gyroscope, and/or an actuator. The output component 460 enables device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, and/or an antenna.

The device 400 may perform one or more processes described herein. For example, a non-transitory computer-readable medium (e.g., the memory 430 and/or the storage component 440) may store a set of instructions (e.g., one or more instructions, code, software code, and/or program code) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
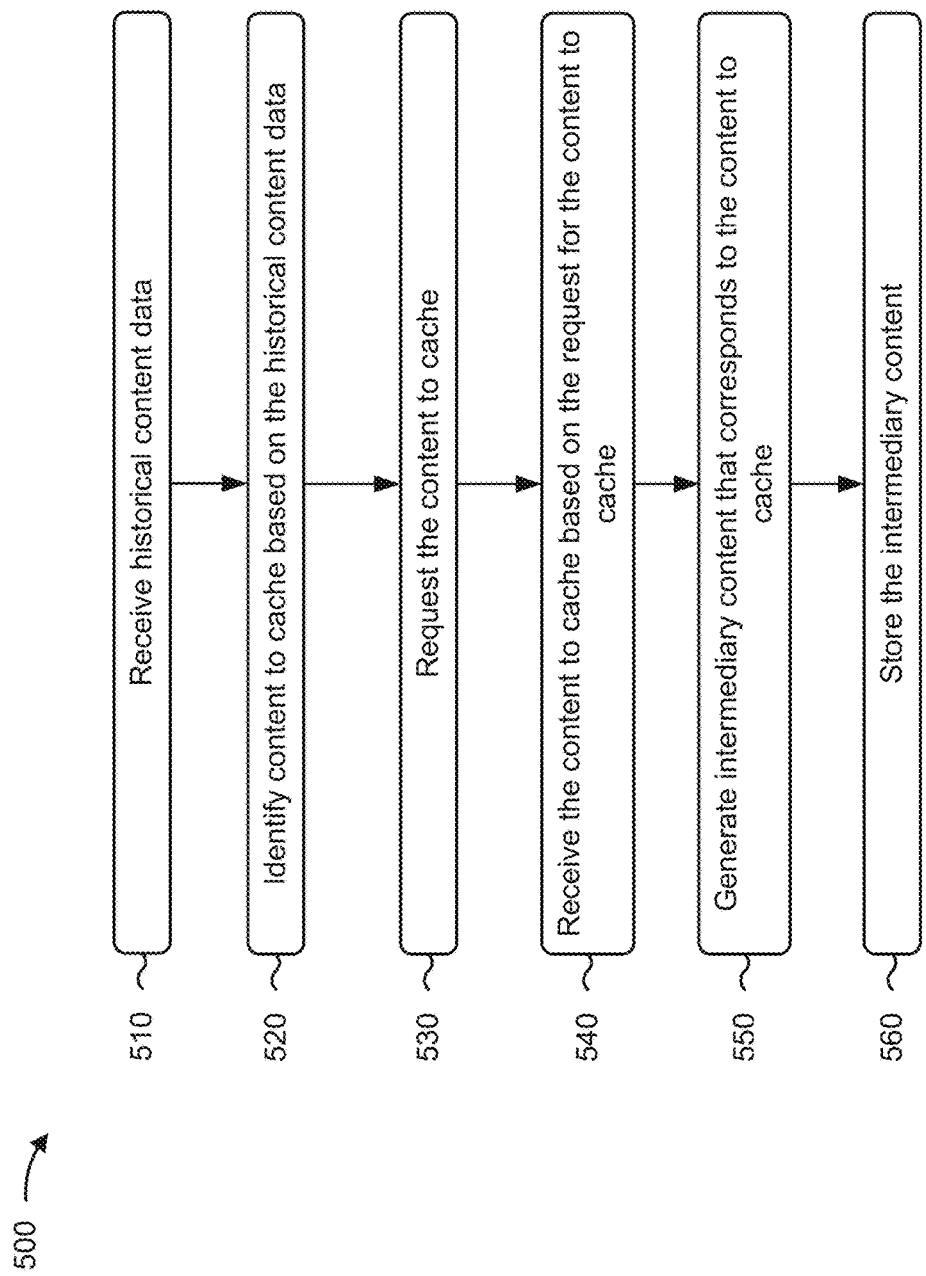
FIG. 5 is a flowchart of an example process for optimizing provision of high latency content by a network.

FIG. 5 is a flowchart of an example process 500 for optimizing provision of high latency content by a network. In some implementations, one or more process blocks of FIG. 5 may be performed by a device (e.g., the MEC device 115). In some implementations, one or more process blocks of FIG. 5 may be performed by another device or a group of devices separate from or including the device, such as a base station (e.g., the base station 105) and/or a content provider device (e.g., the content provider device 130). Additionally, or alternatively, one or more process blocks of FIG. 5 may be performed by one or more components of the device 400, such as the processor 420, the memory 430, the storage component 440, the input component 450, the output component 460, and/or the communication component 470.

As shown in FIG. 5, process 500 may include receiving historical content data (block 510). For example, the MEC device may receive historical content data associated with a content application of a UE, as described above. The content application of the UE may include a browser application. The MEC device may be located in an access network associated with the UE and may receive the historical content data from the UE and/or a content provider device. In some implementations, the UE may have access to a plurality of MEC devices and the MEC device may be one of the plurality of MEC devices that is geographically closest to the UE.

As further shown in FIG. 5, process 500 may include identifying content to cache for based on the historical data (block 520). For example, the MEC device may process the historical content data, with a machine learning model, to identify content to cache for the UE, as described above. The machine learning model may include a heuristic prediction model. In some implementations, the MEC device may receive additional historical content data associated with a plurality of other UEs and the MEC device may process the historical content data and the additional historical content data, with the machine learning model, to identify the content to cache for the UE.

In some implementations, the MEC device may receive network data identifying a bandwidth associated with an access network of the UE and a latency associated with the access network. The MEC device may process the historical content data and the network data, with the machine learning model, to identify the content to cache. The content to cache may include content accessed by the content application of the UE and that fails to satisfy a latency threshold, a percentage of content accessed by the content application of the UE, based on latencies associated with the content, content accessed by the content application of the UE and that is identical to content accessed by other UE, and/or the like.

In some implementations, the MEC device may create a latency table that identifies the content accessed by the content application of the UE and latencies associated with the content. The MEC device may identify, as the content to cache, a percentage of the content identified in the latency table, based on the latencies associated with the content.

As further shown in FIG. 5, process 500 may include requesting the content to cache (block 530). For example, the MEC device may provide, to a content provider device, a request for the content to cache, as described above.

As further shown in FIG. 5, process 500 may include receiving the content to cache based on the request for the content to cache (block 540). For example, the MEC device may receive, from the content provider device, the content to cache based on the request for the content to cache, as described above. In some implementations, the MEC device may receive the content to cache during a time period identified by the content provider device.

As further shown in FIG. 5, process 500 may include generating intermediary content that corresponds to the content to cache (block 550). For example, the MEC device may process the content to cache, with a document object model and a browser object model, to generate intermediary content that corresponds to the content to cache, as described above. The intermediary content may include a format that requires less processing by the content application of the UE relative to a format of the content to cache.

As further shown in FIG. 5, process 500 may include storing the intermediary content (block 560). For example, the MEC device may store the intermediary content in a data structure associated with the MEC device, as described above. The MEC device may receive, from the UE, a request for particular content included in the content to cache. The MEC device may identify, in the data structure and based on the request for the particular content, particular intermediary content that corresponds to the particular content. The MEC device may provide the particular intermediary content to the UE.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a multi-access edge computing device, historical content data associated with a content application of a user equipment;
   processing, by the multi-access edge computing device, the historical content data, with a machine learning model, to identify content, from available content, to cache for the user equipment;
   providing, by the multi-access edge computing device and to a content provider device, a request for the content to cache;
   receiving, by the multi-access edge computing device and from the content provider device, the content to cache based on the request for the content to cache,
      wherein the content to cache is selected from the available content based on one or more of:
         the available content being accessed by the content application of the user equipment and failing to satisfy a latency threshold, or
         the available content being associated with latencies satisfying one or more specified criteria;
   generating, by the multi-access edge computing device, intermediary content corresponding to the content to cache based on receiving the content to cache; and
   storing, by the multi-access edge computing device, the intermediary content in a data structure associated with the multi-access edge computing device for subsequent retrieval responsive to requests for the content corresponding to the intermediary content.

2. The method of claim 1, further comprising:
   receiving, from the user equipment, a request for particular content included in the content to cache;
   identifying, in the data structure and based on the request for the particular content, particular intermediary content that corresponds to the particular content; and
   providing the particular intermediary content to the user equipment.

3. The method of claim 1, wherein receiving the historical content data associated with the content application of the user equipment comprises one or more of:
   receiving the historical content data from the user equipment; or
   receiving the historical content data from the content provider device.

4. The method of claim 1, wherein generating the intermediary content includes:
   processing the content to cache with a document object model and a browser object model to generate the intermediary content.

5. The method of claim 1, further comprising:
   receiving network data identifying a bandwidth associated with an access network of the user equipment and a latency associated with the access network,
      wherein processing the historical content data, with the machine learning model, to identify the content to cache comprises:
         processing the historical content data and the network data, with the machine learning model, to identify the content to cache.

6. The method of claim 1, wherein the content to cache is further selected from the available content based on one or more of:
   a percentage of the available content accessed by the content application of the user equipment, based on latencies associated with the content, or the available content accessed by the content application of the user equipment and that is identical to content accessed by other user equipment.

7. The method of claim 1, wherein receiving the content to cache comprises:
receiving the content to cache during a time period identified by the content provider device.

8. A multi-access edge computing device, comprising:
one or more processors configured to:
receive historical content data associated with a content application of a user equipment;
receive network data identifying a bandwidth associated with an access network associated with the user equipment and a latency associated with the access network;
process the historical content data and the network data, with a machine learning model, to identify content, from available content, to cache for the user equipment;
provide, to a content provider device, a request for the content to cache;
receive, from the content provider device, the content to cache based on the request for the content to cache,
wherein the content to cache is selected from the available content based on one or more of:
the available content being accessed by the content application of the user equipment and failing to satisfy a latency threshold, or
the available content being associated with latencies satisfying one or more specified criteria;
process the content to cache, with a document object model and a browser object model, to generate intermediary content that corresponds to the content to cache; and
store the intermediary content in a data structure associated with the multi-access edge computing device for subsequent retrieval to requests for the content corresponding to the intermediary content.

9. The multi-access edge computing device of claim 8, wherein the one or more processors, when processing the historical content data, with the machine learning model, to identify the content to cache, are configured to:
create a latency table that identifies the content accessed by the content application of the user equipment and latencies associated with the content; and
identify, as the content to cache, a percentage of the content identified in the latency table, based on the latencies associated with the content.

10. The multi-access edge computing device of claim 8, wherein the intermediary content includes a format that requires less processing by the content application of the user equipment relative to a format of the content to cache.

11. The multi-access edge computing device of claim 8, wherein the multi-access edge computing device is located in an access network associated with the user equipment and the multi-access edge computing device is one of a plurality of multi-access edge computing devices that is geographically closest to the user equipment.

12. The multi-access edge computing device of claim 8, wherein the user equipment has access to a plurality of multi-access edge computing devices and the multi-access edge computing device is one of the plurality of multi-access edge computing devices that is geographically closest to the user equipment.

13. The multi-access edge computing device of claim 8, wherein the one or more processors are further configured to:
receive additional historical content data associated with a plurality of other user equipment; and
wherein the one or more processors, when processing the historical content data, with the machine learning model, to identify the content to cache for the user equipment, are configured to:
process the historical content data and the additional historical content data, with the machine learning model, to identify the content to cache for the user equipment.

14. The multi-access edge computing device of claim 8, wherein the content application includes a browser application.

15. A non-transitory computer-readable medium storing a set of instructions, the set of instructions comprising:
one or more instructions that, when executed by one or more processors of a multi-access edge computing device, cause the multi-access edge computing device to:
receive historical content data associated with a content application of a user equipment;
process the historical content data, with a machine learning model, to identify content, from available content, to cache for the user equipment;
provide, to a content provider device, a request for the content to cache;
receive, from the content provider device, the content to cache based on the request for the content to cache,
wherein the content to cache is selected from the available content based on one or more of:
the available content being accessed by the content application of the user equipment and failing to satisfy a latency threshold, or
the available content being associated with latencies satisfying one or more specified criteria;
process the content to cache, with a document object model and a browser object model, to generate intermediary content that corresponds to the content to cache;
store the intermediary content in a data structure associated with the multi-access edge computing device;
receive a request for particular content included in the content to cache;
identify, in the data structure and based on the request for the particular content, particular intermediary content that corresponds to the particular content; and
respond to the request for the particular content with the particular intermediary content.

16. The non-transitory computer-readable medium of claim 15, wherein the historical content data is received from one or more of the user equipment or the content provider device.

17. The non-transitory computer-readable medium of claim 15, wherein the one or more instructions further cause the multi-access edge computing device to:
receive network data identifying bandwidth associated with an access network and a latency associated with the access network; and
wherein the one or more instructions, that cause the multi-access edge computing device to process the historical content data, with the machine learning model, to identify the content to cache, cause the multi-access edge computing device to:
process the historical content data and the network data, with the machine learning model, to identify the content to cache.

18. The non-transitory computer-readable medium of claim 15, wherein the one or more instructions, that cause the multi-access edge computing device to process the historical content data, with the machine learning model, to identify the content to cache, cause the multi-access edge computing device to:
create a latency table that identifies the content accessed by the content application of the user equipment and latencies associated with the content; and
identify, as the content to cache, a percentage of the content identified in the latency table, based on the latencies associated with the content.

19. The non-transitory computer-readable medium of claim 15, wherein the intermediary content includes a format that requires less processing by the content application of the user equipment relative to a format of the content to cache.

20. The non-transitory computer-readable medium of claim 15, wherein the one or more instructions further cause the multi-access edge computing device to:
receive additional historical content data associated with a plurality of other user equipment; and
wherein the one or more instructions, that cause the multi-access edge computing device to process the historical content data, with the machine learning model, to identify the content to cache for the user equipment, cause the multi-access edge computing device to:
process the historical content data and the additional historical content data, with the machine learning model, to identify the content to cache for the user equipment.

* * * * *